United States Patent

[11] 3,623,033

[72] Inventor Philip A. Harding
Palos Verdes, Calif.

[21] Appl. No. 50,531
[22] Filed June 29, 1970
[45] Patented Nov. 23, 1971
[73] Assignee Electronic Memories and Magnetics Corporation
Los Angeles, Calif.

[54] CROSS-COUPLED BRIDGE CORE MEMORY ADDRESSING SYSTEM
10 Claims, 2 Drawing Figs.

[52] U.S. Cl. .... 340/174 TB, 340/174 LA, 340/174 M
[51] Int. Cl. .... G11c 7/00, G11c 11/06
[50] Field of Search .... 340/174 M, 174 LA, 174 TB

[56] References Cited

OTHER REFERENCES

IBM Technical Disclosure Bulletin Vol. 8; No. 2 July 1965, pg. 335.

*Primary Examiner*—James W. Moffitt
*Attorney*—Lindenberg, Freilich & Wasserman

ABSTRACT: A drive system for a coincident-current magnetic core memory is disclosed which employs a fewer number of transistors to steer drive current of proper polarity through a selected line for read and write cycles. The lines are grouped into 2N groups of S lines, and the groups are associated in pairs. A given pair of groups is cross-coupled to the emitters of one of N pair of transistor switches by diodes, each poled for forward conduction when one of the transistors is activated depending upon both the direction of current flow desired and the group in which the particular line to be driven is. A voltage is applied to the activated transistor of proper polarity for the drive current, and one of S bipolar drive current sources is activated to uniquely drive current through the particular line in the desired direction.

INVENTOR.
PHILIP A. HARDING
BY
Sandinberg, Friedlich & Wissermann
ATTORNEYS

INVENTOR.
PHILIP A HARDING
BY
*[signature]*
ATTORNEYS

CROSS-COUPLED BRIDGE CORE MEMORY ADDRESSING SYSTEM

BACKGROUND OF THE INVENTION

This invention relates to a drive system for a magnetic core memory, and more particularly to such a system employing a current-steering technique whereby a plurality of drive lines are associated in paired groups with cross-coupled selection switches for read and write cycles in drive lines of both groups.

Coincident current core memories have been widely used in many configurations. In each configuration, magnetic cores are arranged in rectangular arrays commonly referred to as bit planes with drive lines through the cores so arranged that each core has only one pair of orthogonal drive lines commonly referred to as X and Y lines. Half currents are driven in selected X and Y lines to force a given core to a "0" state during a read cycle. During a write cycle, binary digits of a data word are inserted in respective bit planes at the same X–Y address by driving half currents in the X and Y lines in the opposite direction of that selected for the read cycle. To assure that only cores in bit planes which are to store binary 1's are actually forced to the "1" state during a write cycle, selected cores in all bit planes receive conditional inhibit currents in third lines. In other configurations, operation of a selected X line, which is common to all bit planes, remains the same while the selected Y line in each plane is unique to each bit plane so that a binary 1 may be stored in a given bit plane by employing a conditional half select Y drive current, thereby eliminating the need for a third inhibit line in each bit plane. The present invention has application to both types of coincident current core memory configurations, as well as the conventional linear-select configuration which employs a conditional half select current during a write cycle and a full select current during a read cycle.

In current core memory systems to which the present invention relates, it is customary to arrange the X and Y lines in groups to facilitate addressing a given line such that a given current source is activated at one end of a group of lines while a current source is simultaneously activated at the opposite end of a second group of drive lines. The two groups of drive lines are chosen from the array such that only one line will have current driven through it by the selective activation of the current sources. In practice, switches and diodes are employed to connect the respective drive lines to the current sources to prevent current in a selected line from returning through unselected lines connected to other switches, and a voltage source may be used in place of one of the current sources.

In such a customary arrangement, selective drive current is thus provided through a given line in only one direction. Therefore, a second set of selection switches must be provided for selective current drive in the opposite direction with bipolar current sources or separate, oppositely poled, current sources, and voltage sources where voltage sources are used at one end in place of current sources. Thus, to selectively address a given line for both read and write cycles, two sets of selection switches are generally required. In addition, the number of selection diodes required to prevent sneak currents through unselected lines is greater than would be required for just one set of selection switches.

An object of this invention is to provide a core memory system which requires a reduced number of switches for selecting a given line and driving current in the proper direction for both read and write cycles.

SUMMARY OF THE INVENTION

In accordance with the present invention, a number of like drive lines, such as Y drive lines of a coincident current core memory, are grouped into 2N groups of S lines, wherein N and S are integers, preferably integers that are powers of 2 to facilitate binary coded addressing. The lines of a given group are connected together at one end to form a common junction. The common junctions of two groups of lines are paired by a unique pair of 2N switching transistors of like conductivity type. The paired switching transistors are cross-coupled through buffer diodes such that one transistor of a given pair serves a first unique group of S lines during a read cycle and a second unique group of S lines during a write cycle. The second transistor of the given pair then serves the first group of S lines during a write cycle and the second unique group of S lines during a read cycle. To complete selection of a given line in a group, a bipolar current source is selectively activated with the appropriate polarity while a voltage or current pulse of appropriate polarity is applied to the collector or emitter of the transistor switches through buffer diodes. The cross-coupling of the transistors is between the collector of one to the emitter of the other through two diodes in series with the junction between the two diodes connected to the common junction of one of a paired group of lines. The collector of the other is similarly cross-coupled to the emitter of the one transistor, and the junction between cross-coupling diodes is connected to the common junction of the other of a paired group of lines.

The novel features that are considered characteristic of this invention are set forth with particularity in the appended claims. The invention will best be understood from the following description when read in conjunction with the accompanying drawings.

DESCRIPTION OF THE PREFERRED EMBODIMENT

In general, a number (2NS) of like drive lines, such as Y drive lines of a 2 ½D coincident current core memory, are grouped into two N groups of S lines. For example, the Y lines of a mega-word memory are 1,024 in number. If N is selected to be 32, the Y lines may be grouped into 64 groups of S lines, where S is chosen to be equal to 16. For convenience, only two groups 10 and 11 are shown, and only the respective first line and second line of the groups 10 and 11 are shown in detail.

Figure 1:
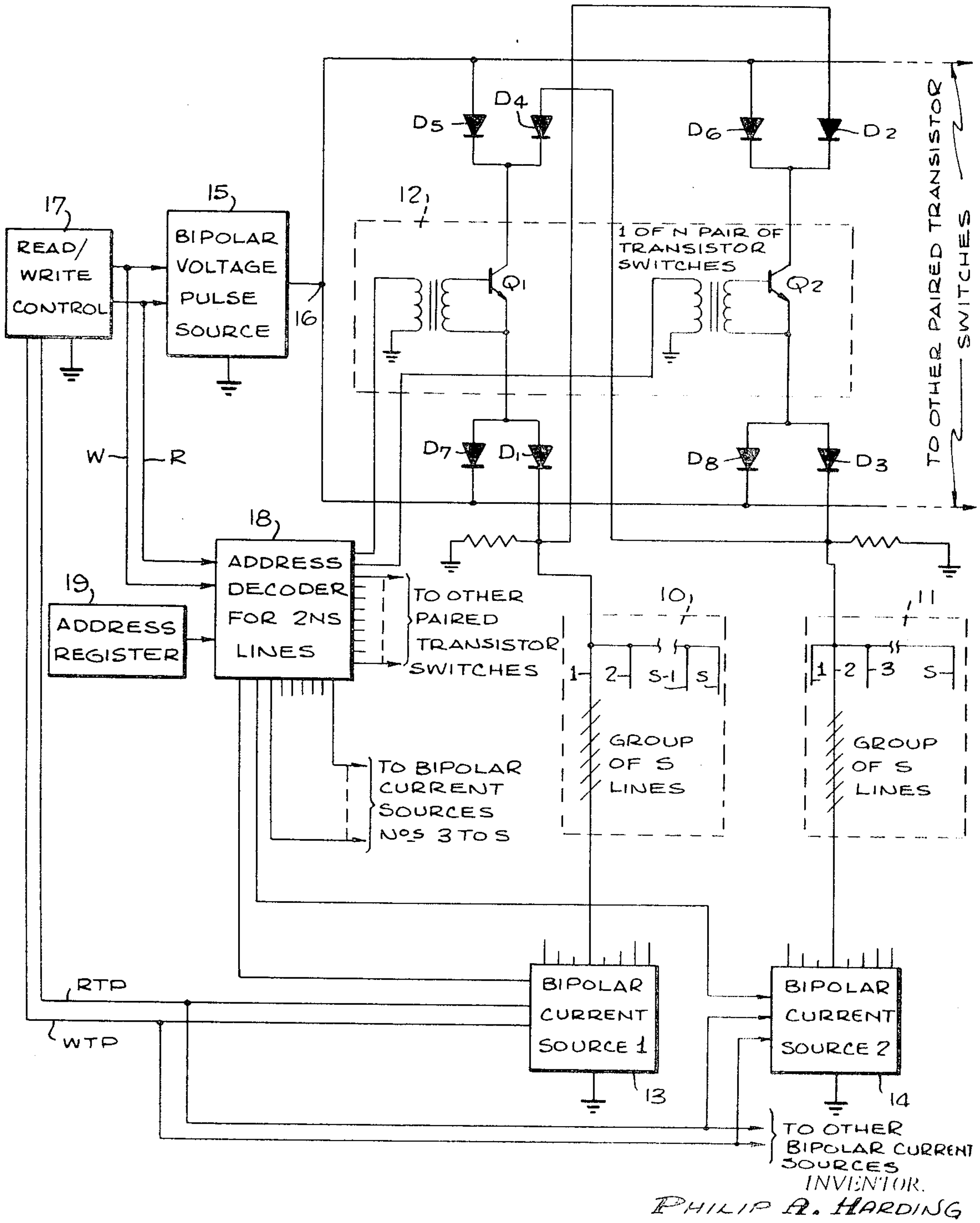
FIG. 1 illustrates an exemplary embodiment of the present invention.

The lines of a given group are connected together to form a common junction at one end, the upper end as viewed in FIG. 1, and the common junction of each group thus formed is connected to a unique pair of switching transistors of like conductivity type. For example, the common junction of the group 10 is connected to a pair 12 of switching transistors $Q_1$ and $Q_2$ through buffer diodes $D_1$ and $D_2$ to form one of two cross-coupling circuits of one pair of transistors.

The diode $D_1$ connects the emitter of the transistor $Q_1$ to the group 10 for read current into a bipolar current source, such as a bipolar current source 13 connected to the first line of the group 10 and the first line of all other groups. The diode $D_2$ connects the collector of the transistor $Q_2$ to the group 10 for write current through the first line of the group 10 from the bipolar current source 13.

Diodes $D_3$ and $D_4$ similarly connect the common junction of the group 11 to the transistors $Q_1$ and $Q_2$ for read and write cycles, respectively. A bipolar current source 14 completes the current path for the second line of that group 11, as well as the second line of all other groups in the array just as the bipolar current source 13 completes the current path for the first line of each group in the memory array. Thus, the groups of S lines in the memory array are associated in pairs with cross-coupled transistor switches each of which may be a common floating transformer coupled transistor switches as shown. Other forms of transistor switches commonly used in magnetic core memories may, of course, be used instead with their emitters and collectors cross-coupled through buffer diodes $D_1$ and $D_2$ in series and $D_3$ and $D_4$ in series with the junctions between the pairs of series connected diodes connected to the common junctions of the groups of lines 10 and 11.

Read currents through the transistors $Q_1$ and $Q_2$ are conducted through respective diodes $D_5$ and $D_6$ which couple the respective collectors of the transistors $Q_1$ and $Q_2$ to a bipolar voltage pulse source 15. Similarly, write currents through transistors $Q_1$ and $Q_2$ are conducted by diodes $D_7$ and $D_8$ which couple the emitters of the respective transistors $Q_1$ and $Q_2$ to the bipolar voltage pulse source 15.

The output of the bipolar voltage pulse source 15 provides a voltage pulse of proper polarity to the coupling diodes $D_5$ to $D_8$ through a common junction 16. For a read cycle, the polarity of the voltage pulse is positive, and for a write cycle, the polarity is negative. The timing and polarity of the pulse applied to the common junction 16 is controlled by a read-write control unit 17 which is customarily provided in coincident current core memories since drive current for a read cycle must be opposite the polarity of drive currents for a write cycle.

Figure 2:
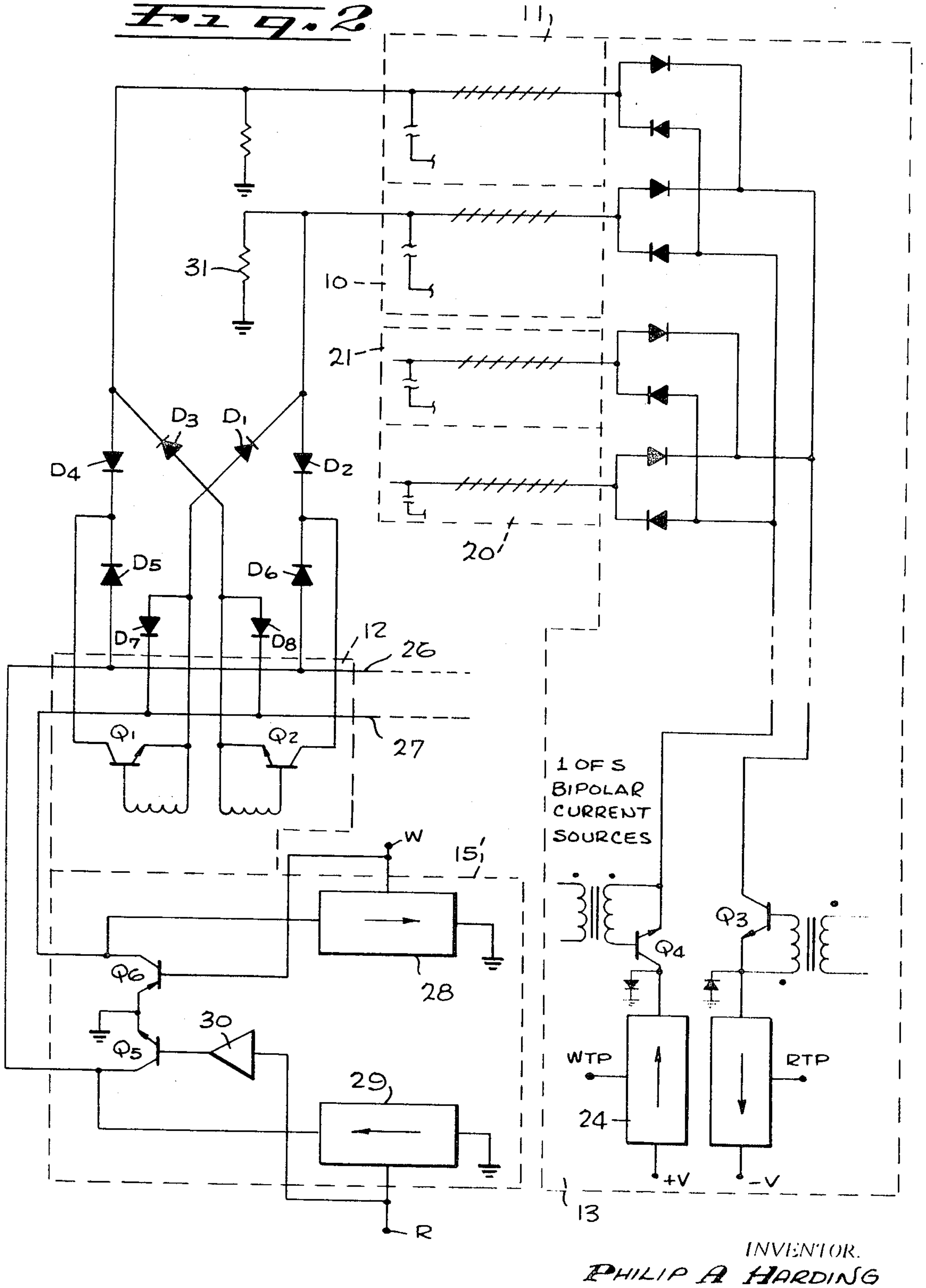
FIG. 2 is a more detailed schematic diagram of the exemplary embodiment of FIG. 1 with a pair of current sources replacing a bipolar voltage source.

It should be noted that other embodiment of the invention may use separate control terminals for each polarity rather than a common junction, such as the embodiment of FIG. 2. It should also be noted that the excitation at the common junction, or the separate control terminals, may be accomplished with any network that will allow current flow with proper polarity.

Assuming the polarity of current through a selected line is as just suggested, namely positive for current into a bipolar current source during a read cycle, and negative for a current from the bipolar current source during a write cycle, a given line is selected for a read or a write cycle by applying a voltage pulse at the junction 16 with a polarity dependent upon the direction of current flow desired. At the same time, one of the transistors $Q_1$ and $Q_2$ of a particular pair is selectively activated. The selection is based upon both the direction of current flow desired and the particular drive line through which current is to flow. Thus, to drive current in the read direction in line 1 of group 10, for example, a positive voltage pulse is applied to the junction 16 and the transistor $Q_1$ is turned on. Current than flows through diodes $D_5$ and $D_1$ into line 1 of group 10 when the bipolar current source 13 is activated for positive current. To drive current in the write direction in line 1 of group 10, a negative pulse is applied to the junction 16 and the transistor $Q_2$ is turned on. Current then flows through diodes $D_2$ and $D_8$ from the line 1 of group 10 when the bipolar current source 13 is activated for negative current. To drive current in the read direction in a line included in group 11, such as line 2, a positive voltage pulse is applied to the junction 16, and the transistor $Q_2$ is turned on. Current then flows through the diodes $D_6$ and $D_3$ into the line 2 of group 11 when the bipolar current source 14 is activated for positive current. Finally, to drive current in the write direction in line 2 of group 11, a negative voltage pulse is applied to the junction 16 and $Q_1$ is turned on. Current then flows through diodes $D_4$ and $D_7$ from the line 2 of group 11 when the bipolar current source 14 is activated for negative current.

In summary, 2N groups of S lines are paired with N pair of transistor switches to control read and write currents through lines of the paired groups. That is accomplished by coupling the emitter of the first transistor $Q_1$ to a first group of lines 10 with a diode $D_1$ poled for forward conduction while the first transistor $Q_1$ is turned on, and the collector of the first transistor to the second group of lines with a diode $D_4$ poled for forward conduction while the first transistor is turned on. The emitter and collector electrodes of the second transistor are similarly connected to the respective second group 10 and first group 11 of the paired groups of lines. A voltage of a given polarity is coupled to the emitter of each transistor by a separate diode poled for forward conduction when the transistor thus coupled is turned on, such as diodes $D_7$ and $D_8$ for the transistors $Q_1$ and $Q_2$. The polarity of the voltage is selected to assure that the transistor conducts when the base-emitter junction thereof is forward biased. Similarly, a voltage of opposite polarity is coupled to the collector of each transistor by a separate diode, such as diodes $D_5$ and $D_6$ for transistors $Q_1$ and $Q_2$ poled for forward conduction when the transistor thus coupled is turned on. For the NPN transistors shown, the voltage selectively applied to the emitters through diodes $D_7$ and $D_8$ is negative, and to the collectors through diodes $D_5$ and $D_6$ is positive.

In operation, the polarity of the voltage applied to the collector and emitter coupling diodes $D_5$ and $D_8$ is selected for the direction of current flow desired, and, as noted hereinbefore, which one of a given pair of transistors is turned on depends on both the direction of current flow desired and the particular line through which the current is to flow. To complete the current path for drive current of either polarity, the other end of each drive line in a group is connected to a different one of S bipolar drive current sources, such as the bipolar current source 13 for the first line of each group, and the bipolar current source 14 for the second line of each source. Each drive current source provides current of the required polarity for read and write cycles in response to control signals from the read/write control section 17, but only one drive current source will operate during a read or write cycle, depending upon the line through which current is to flow as determined by an address decoder 18 connected to an address register 19.

In a typical mega-word memory, 1,024 memory locations may be addressed by four bits ($Y_6$ to $Y_9$) of a 10-bit Y address ($Y_0$ to $Y_9$) which are decoded to selectively actuate one bipolar current source using conventional techniques while the remaining bits $Y_0$ to $Y_5$ (where $Y_0$ is the least significant bit) are decoded to selectively activate one of a pair of transistor switches depending upon both the direction of current flow desired, and the particular group containing the line through which current is to flow. For example, all even numbered Y lines of the array may be grouped in even numbered groups, such as group 10. All odd numbered lines of the array would then be grouped in odd numbered groups, such as group 11. To store a binary digit in a line of group 10, the complement $\overline{Y}_0$ of the least significant bit of the address may be combined directly with the decoded output of bits $Y_1$ to $Y_5$ to selectively turn on the transistor $Q_2$ according to the logic equation $Q_2=\overline{Y}_0 \cdot G_n \cdot W$, where $G_n$ is the decoded output of bits $Y_1$ to $Y_5$ designating a given pair of switches for a paired group of lines, such as groups 10 and 11, and W is a write timing signal. To store a binary digit in a line of group 11, the transistor $Q_1$ is selected by the logic equation $Q_1=Y_0 \cdot G_n \cdot W$. To read a binary digit from a line in group 10, the transistor $Q_1$ is selected by the logic equation $Q_1=Y_0 \cdot G_n \cdot R$ and from a line in group 11, the transistor $Q_2$ is selected by the logic equation $Q_2=\overline{Y}_0 \cdot G_n \cdot R$, where $R$ is a read timing signal. If conditional Y drive current is provided to store, instead of a conditional inhibit current in a third line for a given bit plane, the store equations would include the date bit D. Thus, for a conditional Y drive current, the complete logic equations for selectively turning on the transistors $Q_1$ and $Q_2$ are as follows:

$$Q_1=[Y_0 \cdot G_n] \cdot W \cdot D+[\overline{Y}_0 \cdot G_n] \cdot R$$
$$Q_2=[\overline{Y}_0 \cdot G_n] \cdot W \cdot D+[Y_0 \cdot G_n] \cdot R$$

The line being addressed in the group defined by the bracket portions of the equations is then uniquely defined when the address decoder 18 selectively activates one of S bipolar current sources, such as sources 13 and 14, in response to the address bits $Y_6$ to $Y_9$. The proper polarity of the drive current is effectively selected by read and write timing signals RTP and WTP which turn the selected polarity of current on.

Referring now to FIG. 2, the exemplary embodiment of FIG. 1 will be described. For convenience, like elements are referred to by the same reference numbers in FIGS. 1 and 2 even though the junction 16 of FIG. 1 is not retained in the arrangement of FIG. 2 where a pair of constant current sources are employed in place of the bipolar voltage pulse source 15 of FIG. 1.

Additional groups 20 and 21 of S lines are shown. Like the groups 10 and 11, the additional groups are paired with a pair of transistor switches (not shown) in the same manner that the groups 10 and 11 are paired with the transistors $Q_1$ and $Q_2$. The corresponding drive lines of the groups are connected through selection diodes to paired drive selection transistors (of common floating transformer coupled configuration) to which control signals are applied selectively by the address decoder 18 (FIG. 1) in accordance with the logic equations $Q_3 = B_S \cdot W$ and $Q_4 = B_S \cdot R$, where $B_S$ is the decoder output to the bipolar current source 13 which includes the selection diodes. For example, the first line of each group is connected to the transistors $Q_3$ and $Q_4$.

The transistors $Q_3$ and $Q_4$ are connected to pulsed current sources 23 and 24. During a read cycle, while transistor $Q_3$ is turned on, the current source 23 is turned on by a read timing pulse RTP. Similarly, during a write cycle, while transistor $Q_4$ is turned on, the current source 24 is turned on by a write timing pulse WTP. Selection diodes coupling the transistors $Q_3$ and $Q_4$ to the drive lines prevent drive current through the selected line from disturbing unselected lines in the customary manner.

The junction 16 in FIG. 1 is replaced by two distribution lines 26 and 27, one for each polarity of a bipolar current pulse source 15' which comprises a pair of pulsed current sources 28 and 29 for charging drive lines in a selected group to the proper voltage for the selected drive current from the bipolar current source 13. Transistors $Q_5$ and $Q_6$ are conducting to shunt the distribution lines 26 and 27 to circuit ground while the pulsed current sources 28 and 29 are inactive.

During a read cycle, the transistor $Q_5$ is turned off by the read control signal R via an inverter 30. Simultaneously, the pulsed current source 29 is activated and a transistor switch from one of N pair is selectively turned on, such as transistor $Q_2$. The current source 29 supplies energy to charge the common junction of the selected group of lines to a predetermined positive potential +V. In practice, some means for terminating the drive lines of the selected group in their approximate impedance would be connected to the common junction to suppress reflections and ringing once the common junction reaches the potential + V. In addition, some means may be provided to stabilize the voltage at the common junction, and to terminate the drive end of selected lines in their approximate characteristic impedance to suppress ringing when the pulsed current driver is turned on.

The transistor $Q_3$ is turned on either simultaneously with the turn off of transistor $Q_5$, as shown, or delayed. Once the common junction of the selected group of lines has achieved full voltage, the pulsed drive current source 23 is activated in response to a read timing pulse RTP. A write cycle is carried out in a similar manner, charging the common junction to −V by turning off $Q_6$ and turning on the pulsed current source 28, and then activating the drive current source 24. A large resistor 31 returns the potential of the common junction to circuit ground after a write cycle. At the termination of the write cycle, the transistor $Q_6$ is turned on again to discharge the distribution line 27.

Although a particular embodiment of the invention has been described and illustrated herein, it is recognized that modifications and variations may readily occur to those skilled in the art. For example, although one set of pulsed current sources 23 and 24 is implied for each of S bipolar current sources, in practice, a single set may be time shared with S sets of selecting transistor switches $Q_3$ and $Q_4$ to form S bipolar current sources. Accordingly, inasmuch as it is recognized that modifications and variations falling within the spirit of the invention will occur to those skilled in the art, it is not intended that the scope of the invention be determined by the disclosed embodiments, but rather by the breadth of the appended claims.

What is claimed is:

1. In a drive system for a magnetic core memory in which drive lines of a given set for at least one bit plane are grouped into 2N groups, each group having S lines, where N and S are integers, and the groups are associated in pairs, the combination comprising:

- a first plurality of diodes, $D_1$, $D_3$, etc., one for each of said 2N groups of lines, a given diode connected to all lines at a common end thereof of a given group and poled for conduction in said lines of current in a given direction;
- a second plurality of diodes, $D_2$, $D_4$, etc., one for each of said 2N groups of lines, a given diode connected to all lines at said common end of a given group, and poled for conduction of current in said lines in a direction opposite said given direction;
- a plurality of transistors, one for each of said 2N groups of lines, said transistors being associated in pairs by having an emitter of a given transistor connected in series with one of said first plurality of diodes and one of said groups of lines, and a collector of said given transistor connected in series with one of said second plurality of diodes and a different one of said groups of lines, whereby the collector of a given transistor of a pair of transistors is coupled to a unique one of two paired groups of lines;
- means for switching a selected one of said transistors on;
- means for selectively applying a voltage of a given polarity to emitters of all of said plurality of transistors to forward bias one of said second plurality of diodes when said selected transistor is switched on for current flow in a chosen line in a given direction;
- means for selectively applying a voltage of a polarity opposite said given polarity to collectors of all transistors to forward bias one of said first plurality of diodes when said selected transistor is switched on for current flow in a chosen line in a direction opposite said given direction;
- a plurality of selectively activated bipolar current sources, one source for each of S lines of a given group connected to corresponding lines of all groups at ends thereof opposite said common end; and
- means for selectively activating a bipolar current source connected to said given line for current flow in the direction desired.

2. The combination of claim 1 wherein said means for applying a voltage of a given polarity to emitters of all transistors, and said means for selectively applying a voltage of a polarity of opposite said given polarity to collectors of all transistors comprises a bipolar voltage source having an output terminal connected to said collector and said emitter of each of said plurality of transistors through separate buffer diodes poled for forward conduction through the transistor to which connected when that transistor is selectively switched on.

3. The combination of claim 1 wherein said means for applying a voltage of a given polarity to emitters of all transistors, and said means for selectively applying a voltage of a polarity of opposite said given polarity to collectors of all transistors comprises first and second current sources of opposite polarity, said first source being connected to said collector of each of said plurality of transistors through separate buffer diodes poled for forward conduction when said first source source is selectively activated, and said second source being connected to said emitters of said emitters of each of said plurality of transistors through separate buffer diodes poled for forward conduction when said second source is selectively activated, and means for selectively activating one of said first and second sources.

4. In a drive system for a magnetic core memory in which drive lines of a given set for at least one bit plane are grouped into 2N groups, each group having S lines, where N and S are integers, and the groups are associated in pairs, the combination comprising:

- a pair of transistor switches for each of N pair of said groups of drive lines, each switch comprising a transistor of a given conductivity type having a collector, an emitter, a base, and means for forward biasing the base-emitter junction thereof when the transistor switch is to be activated;
- a first diode coupling said emitter of a first one of said transistors of a given pair of transistor switches to a common end of all lines of a first group of lines of a given associated pair of groups, and a second diode coupling said collector of a second one of said transistors of said given pair of transistor switches to said common end of all lines of said first group of lines of said given associated pair of groups, said first and second diodes being poled for forward conduction through said first and second transistors, respectively;

a third diode coupling said emitter of said one of said transistors of said given pair of transistor switches to a common end of all lines of a second group of lines of said given associated pair of groups, and a fourth diode coupling said collector of said first one of said transistor of said given pair of transistor switches to said common end of all lines of said second group of lines of said given associated pair of groups, said third and fourth diodes being poled for forward conduction through said second and first transistors, respectively;

means for selectively and alternatively applying a voltage of a given polarity to collectors of all transistors of said transistor switches and a voltage of a polarity opposite said given polarity to emitters of all transistors of said transistor switches, depending upon the direction of current flow desired through a given line;

means for selectively activating said forward biasing means of a particular transistor of a pair of transistor switches coupled to a particular pair of groups of lines which includes said given line, depending upon both the direction of current flow desired and the particular group that includes said given line through which current is to flow;

a plurality of selectively activated bipolar current sources, one source for each of S lines of a given group connected to corresponding lines of all groups at ends thereof opposite said common end; and means for selectively activating a bipolar current source connected to said given line for current flow in the direction desired.

5. The combination of claim 4 wherein said means for selectively and alternatively applying a voltage of a given polarity to collectors of all transistors of said transistor switches and a voltage of a polarity opposite said given polarity to emitters of all transistors of said transistor switches comprises a bipolar voltage source having an output terminal connected to said collectors and emitters through separate buffer diodes, a given buffer diode being poled for forward conduction through the transistor to which connected when that transistor is selectively turned on, while the other buffer diode connected to the same transistor is back biased.

6. The combination of claim 4 wherein said means for selectively and alternatively applying a voltage of a given polarity to collectors of all transistors of said transistor switches and a voltage of a polarity opposite said given polarity to emitters of all transistors of said transistor switches comprises first and second current sources of opposite polarity, said first source being connected to said collector of each transistor of said transistor switches through separate buffer diodes poled for forward conduction through said transistors when said first source is selectively activated, and said second source being connected to said emitter of each transistor of said transistor switches through separate buffer diodes poled for forward conduction through said transistors when said second source id selectively activated, and means for selectively activating one of said first and second sources.

7. In a drive system for a magnetic core memory in which at least two drive lines are to be selectively driven with current in one direction for a read cycle and in the opposite direction for a write cycle, the combination of:

a pair of transistor switches comprising respective first and second transistors of like conductivity type, each having an emitter, a collector, a base, and means for forward biasing the base-emitter junctions thereof selectively;

first and second diodes connecting the emitter and collector of said first and second transistors, respectively, to one of said two drive lines, said first diode being poled for conduction of current through said one of said two drive lines in the same direction as current through said base-emitter junction of said first transistor, and said second diode being poled for conduction of current through said one of said two drive lines in the opposite direction as current through said one diode;

third and fourth diodes connecting the emitter and collector of said second and third transistors, respectively, to the other of said two drive lines, said third diode being poled for conduction of current through said other drive line in the same direction as current through said base-emitter junction of said second transistor connected to said other drive line, and said fourth diode being poled for conduction of current in the opposite direction as current through said other diode;

first and second distribution lines;

fifth and sixth diodes connected between said first distribution line and collector electrodes of said first and second transistors, respectively, said fifth and sixth diodes being poled for forward conduction of currents through said first and third diodes, respectively;

seventh and eighth diodes connected between said second distribution line and emitter electrodes of said first and second transistors, respectively, said seventh and eighth diodes being poled for forward conduction of currents through said second and fourth diodes, respectively;

means for selectively producing a potential on a least said first distribution line of a given polarity to forward bias said fifth and sixth diodes for current through a drive line in a given direction, and selectively producing a potential on at least said second distribution line of a polarity opposite said given polarity for current through a drive line in a direction opposite said given direction; and line addressing means for selectively actuating said means for forward biasing the base-emitter junction of one of said transistors depending upon both the line through which drive current is desired and the direction of drive current desired.

8. The combination of claim 7 wherein said first and second distribution lines are connected to a junction and said selective potential-producing means comprises a bipolar voltage means connected to said junction for producing a potential on said first and second distribution lines simultaneously of a polarity dependent upon the direction of current flow desired through a line selected by said line addressing means.

9. The combination of claim 7 wherein only one of said first and second distribution lines is energized by said selective potential-producing means at any given time.

10. The combination of claim 9 including first and second shunt switches connected between circuit ground and said first and second distribution lines, respectively, and means for holding each of said shunt switches in a conducting state, and for switching each one to its nonconductive state while the distribution line to which connected is being selectively energized.

* * * * *